United States Patent [19]
Wilkens

[11] Patent Number: 5,765,901
[45] Date of Patent: Jun. 16, 1998

[54] TARPAULIN ROLL-UP ASSEMBLY AND METHOD

[76] Inventor: Arthur L. Wilkens, 312 N. Walnut, Stockton, Kans. 67669

[21] Appl. No.: 815,557

[22] Filed: Mar. 12, 1997

[51] Int. Cl.[6] .................................................. B60J 11/00
[52] U.S. Cl. ........................................ 296/98; 296/100
[58] Field of Search ...................................... 296/98, 100

[56] References Cited

U.S. PATENT DOCUMENTS

| | | |
|---|---|---|
| Re. 31,745 | 11/1984 | Dimmer et al. . |
| Re. 31,746 | 11/1984 | Dimmer et al. ............ 296/98 |
| 3,563,591 | 2/1971 | Kuss . |
| 4,505,512 | 3/1985 | Schmeichel et al. . |
| 4,691,957 | 9/1987 | Ellingson . |
| 4,915,439 | 4/1990 | Cramaro ........................ 296/98 |
| 5,096,250 | 3/1992 | Menz ............................ 296/98 |
| 5,180,203 | 1/1993 | Goudy ........................... 296/98 |
| 5,482,347 | 1/1996 | Clarys et al. .................. 296/98 |
| 5,549,347 | 8/1996 | Anderson ....................... 296/98 |

*Primary Examiner*—Joseph D. Pape
*Attorney, Agent, or Firm*—Reising, Ethington, Learman & McCulloch

[57] ABSTRACT

The tarpaulin (54) has a first edge (56), clamped to the right side wall (18) by a fixed shaft (60) and pipe retainers (62). A tubular rotatable bar (66) is secured to the second edge (70) of the tarpaulin (54). A square shaft (74) is slidably mounted in a square tube (76) secured inside the bar (66). A universal joint (84) is secured to the square shaft (74) and a crank (100) is secured to the universal joint. The square shaft (74) is moved axially to the rear and the crank (100) is rotated to roll the tarpaulin (54) onto or from the bar (66). When the open top of the cargo container (10) is covered, the square shaft (74) is slid axially forward and the crank (100) is secured to the left side wall (20) by a clevis (114). In this position the door (26) can be opened.

11 Claims, 4 Drawing Sheets

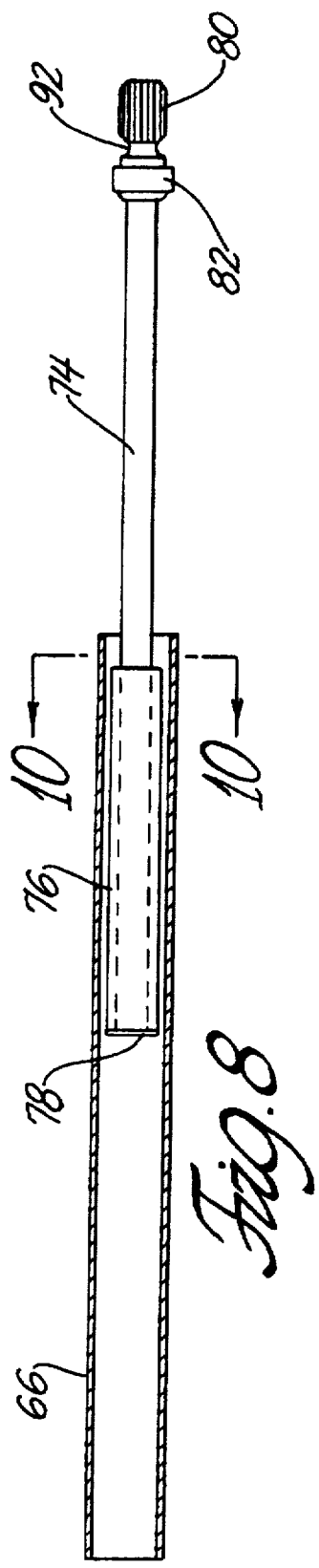
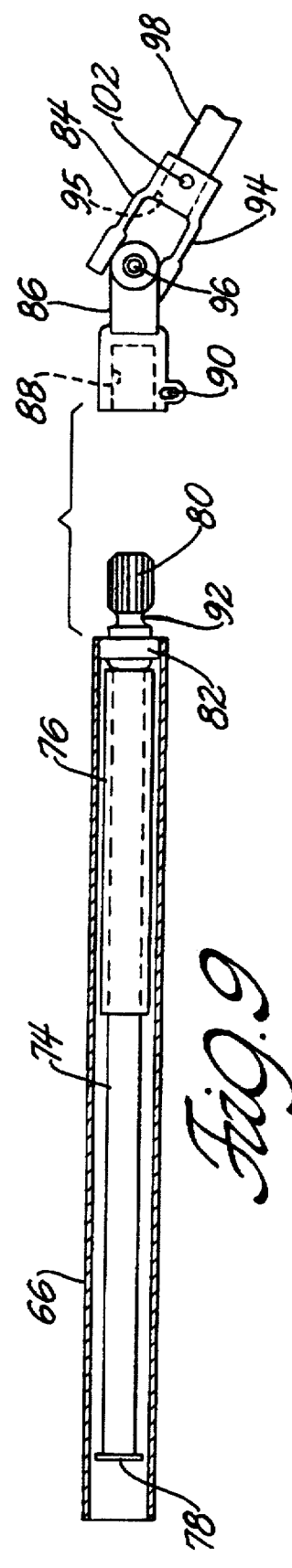
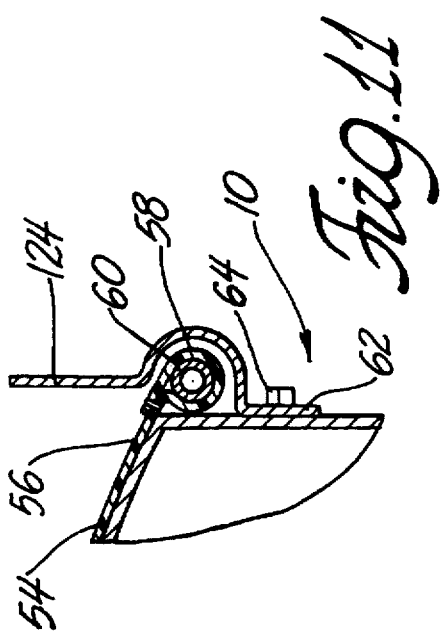
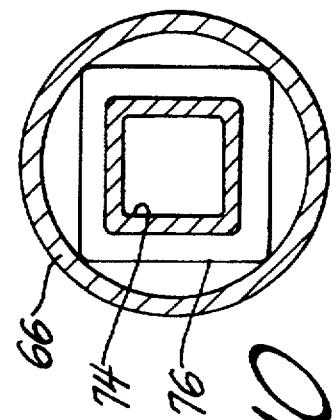

5,765,901

TARPAULIN ROLL-UP ASSEMBLY AND METHOD

TECHNICAL FIELD

This invention is in a tarpaulin roll-up assembly and more particularly in a tarpaulin roll-up crank that is secured and stored on the side of a vehicle that the tarpaulin covers.

BACKGROUND OF THE INVENTION

Vehicle cargo containers for transporting bulk material generally have an open top, two side walls, a front wall, a rear wall, and a floor. The top is required to be open to facilitate the loading of cargo. The rear wall is open to discharge cargo. The open top of the cargo container must be closed when transporting light weight bulk cargo to keep the cargo from being blown out. Container open tops are also closed to protect cargo from moisture and the suns rays.

Tarpaulins are frequently used to close the open tops of vehicle cargo containers. The tarpaulins have one edge clamped to one side of the cargo container and a rotatable pipe attached to another edge of the tarpaulin. The rotatable pipe is rotated in one direction to roll the tarpaulin up and open the open top of the cargo container and is rotated in the opposite direction to unroll the tarpaulin and close the open top of the cargo container. The rotatable pipe can be rotated by a power unit or it can be rotated manually. Manual rotation is generally through a hand crank connected to the rear end of the rotatable pipe by a universal joint or a flexible rubber tube. The crank is either removed from the rotatable pipe or secured to the rear wall of the cargo container for storage. Removal of the crank is undesirable because it can be lost. Attachment to the rear wall of the cargo container is undesirable on some cargo containers because the crank interferes with opening and closing of rear cargo discharge doors.

SUMMARY OF THE INVENTION

An object of the invention is to provide a crank, for rolling up a tarpaulin, which remains attached to the tarpaulin and is stored in a position which permits the rear cargo doors to be opened.

Another object of the invention is to provide a crank for rolling up a tarpaulin which remains attached to the tarpaulin and can be stored adjacent to either side wall or the rear end wall of a cargo container.

A further object of the invention is to provide a roll-up tarpaulin assembly for opening and closing the open top of a cargo container which permits the unloading of cargo from the container with the tarpaulin in a closed position.

The vehicle mounted cargo container has two side walls, a front end wall and a rear end wall. A front end cap is attached to the top of the front end wall and a rear end cap is attached to the top of the rear end wall. The floor can include one or more hoppers with openable doors that open to discharge bulk material from the bottom of the container. The floor can also be a generally flat horizontal cargo support surface. This cargo support surface can be fixed relative to the side walls or it can be a floor conveyor that will convey cargo through a rear discharge opening.

The two side walls and the two end caps define a rectangular opening in the top of the cargo container. One edge of a tarpaulin is clamped to one of the side walls. A rotatable bar is secured to a second edge of the tarpaulin and extends substantially from the front edge to the rear edge of the tarpaulin.

Rotation of the rotatable bar about its axis in one direction wraps the tarpaulin about the bar and moves the bar to a position adjacent to the clamp that clamps the one edge to the cargo container. Rotation of the bar in the opposite direction unwraps the tarpaulin from the bar, moves the bar to the other side wall and covers the open top of the cargo container. The front edge of the tarpaulin covers a portion of the front end cap. The rear edge of the tarpaulin covers a portion of the rear end cap. The rotatable bar is secured to the other side wall of the cargo container and the tarpaulin is tensioned. In this position water tight seals are created between the tarpaulin and the end caps.

The rotatable bar is preferably a tube. A collar is secured to the rear end of the tube. A shaft passes through the collar, is axially slidable relative to the collar and is non-rotatable relative to the collar. A universal joint is secured to a free end of the shaft. A crank with an elongated torque tube shaft is secured to the free side of the universal joint. Axial movement of the shaft outwardly relative to the rotatable bar, until a stop on the shaft contacts the collar and prevents further outward axial movement of the shaft moves an end of the universal joint to the rear of the rear end wall. Axial movement of the shaft inwardly relative to the rotatable bar, until a stop surface on the collar prevents further inward axial movement of the shaft moves the universal joint to a position between the front end wall and the rear end wall.

The crank with an elongated torque tube can be turned manually to roll and unroll a tarpaulin when the shaft is axially slid out of the bar and further outward movement of the shaft is blocked. The crank with an elongated torque tube can be secured to the rear end wall for storage and to lock the rotatable bar in place when the shaft is axially slid out of the bar. The crank with an elongated torque tube can be secured to one side wall when the tarpaulin is wrapped up on the rotatable bar and the shaft is slid into the collar. The crank can also be secure to the other side wall when the tarpaulin is unwrapped from the rotatable bar, the open top to the cargo container is covered by the tarpaulin and the shaft is slid into the bar.

The cargo discharge doors, which form the rear end wall of the cargo container can be opened and cargo can be discharged when a crank is secured to one side wall or the other side wall and the shaft is slid forward into the rotatable bar as far as it will go.

The foregoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 8 is a sectional view of the rotatable bar that the tarpaulin is wound upon and the shaft that rotates the rotatable bar;

FIG. 9 is an expanded sectional view of the parts shown in FIG. 8 and a universal joint;

FIG. 10 is a sectional view taken along line 10—10 in FIG. 8; and

FIG. 11 is an enlarged sectional view showing the pipe retainer for clamping the first edge of a tarpaulin to a wall of the cargo container.

DESCRIPTION OF THE PREFERRED EMBODIMENT

Figure 1:
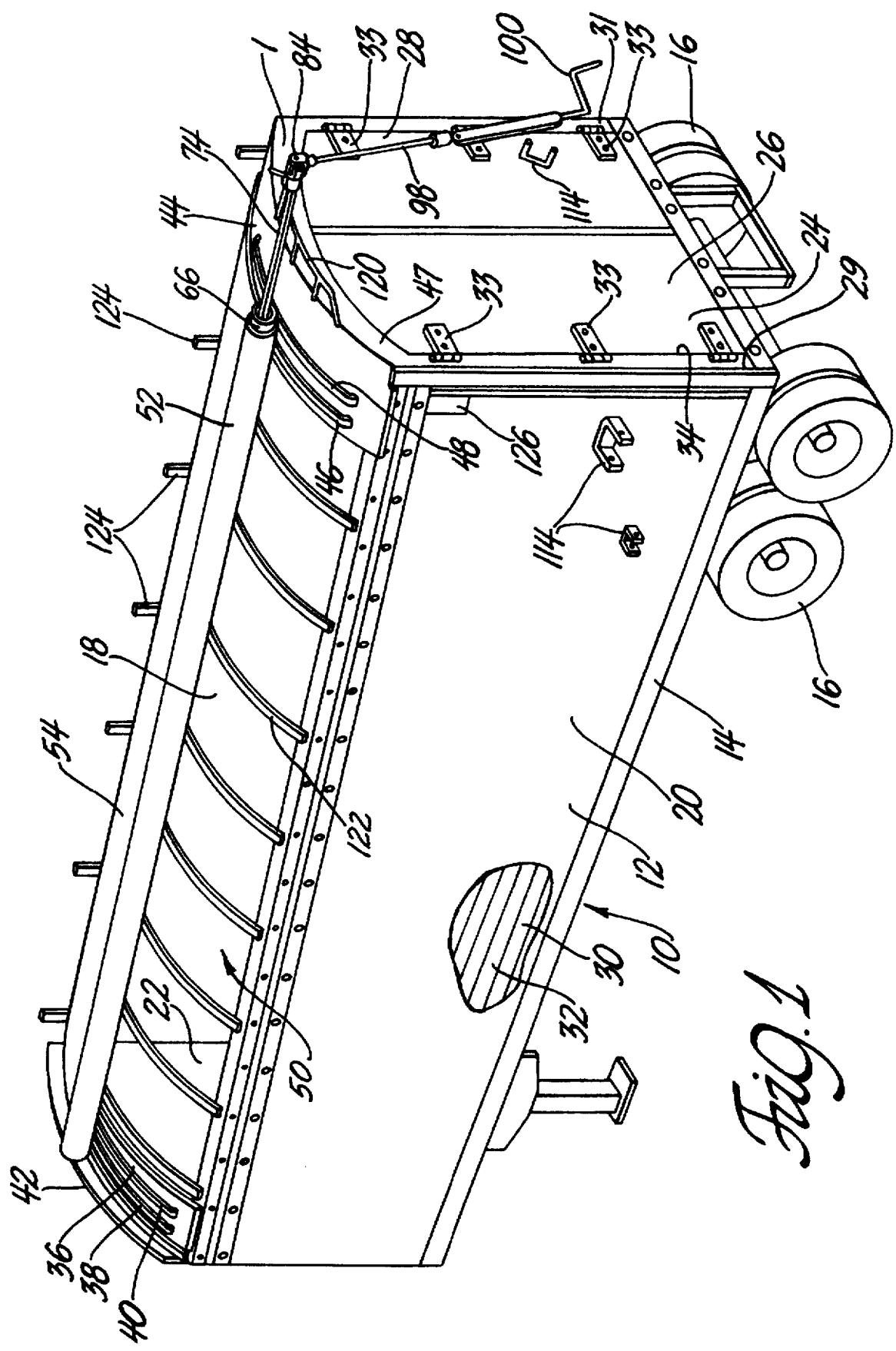
FIG. 1 is a perspective view of a semitrailer with the tarpaulin roll-up assembly and parts broken away.

The cargo container 10 as shown in FIG. 1 is a portion of a semitrailer 12. The semitrailer 12 has a frame 14, rear wheel 16 and a fixed king pin (not shown) that is engagable by a tractor fifth wheel. The cargo container 10 has a right side wall 18, a left side wall 20, a front end wall 22 and a rear end wall 24 formed by doors 26 and 28. The doors 26 and 28 are pivotally attached to side door frame members 29 and 31 by hinges 33. The floor 30 of the cargo container 10 as shown in FIG. 1 is a reciprocating floor conveyor with a plurality of floor slats 32. The floor slats 32 are reciprocated back and forth as explained in U.S. Pat. No. 5,325,957, the disclosure of which is incorporated herein by reference, to discharge cargo through the cargo discharge opening 34 when the doors 26 and 28 are opened.

The floor 30 of the cargo container 10 could be provided with hoppers that permit cargo to flow out the bottom of the cargo container when hopper doors are opened. The floor 30 can also be a fixed solid flat floor. Bulk cargo can be unloaded from a cargo container 12 with a fixed floor by lifting the front of the semitrailer 12 so that bulk cargo can slide down the fixed floor 30 and out through the cargo discharge opening 34.

A front end cap 36 is secured to the front end wall 22, to the right side wall 18, and to the left side wall 20. Bars 38 and 40 are secured to the upper surface of the front end cap 36. These parallel transverse bars 38 and 40 seal against a tarpaulin to keep water out of the cargo container 10. A wind deflector 42 is provided on the leading edge of the front end cap 36. A rear end cap 44 is attached to the rear door frame member 47 above the doors 26 and 28, to the right side wall 18 and to the left side wall 20.

The rear end cap 44 has integral parallel transverse bars 46 and 48 like the bars 38 and 40 of the front end cap. The rear end cap 44 does not have a wind deflector however. The end caps 36 and 44 can be an integral part of the walls 18, 20, 22 and 24 of the cargo container 10 or separate assemblies attached by fasteners.

The open top 50 of the cargo container is a rectangular opening that extends from the right side wall 18 to the left side wall 20 and from the front end cap 36 to the rear end cap 44.

A roll-up tarpaulin assembly 52 closes the open top 50 of the cargo container 10 when the tarpaulin 54 is unrolled and opens the open top when the tarpaulin is rolled up. The tarpaulin 54 is rolled up to uncover and open the open top 50 for loading bulk cargo into the cargo container 10 through the open top 50. The tarpaulin 54 is unrolled and closes the open top 50 when cargo is transported in the cargo container 10 to protect the cargo from the elements. The tarpaulin 54 also closes the open top 50 during movement of an empty cargo container 10 to reduce wind resistance. Unloading of cargo can generally occur when the tarpaulin 54 is closing the open top 50.

The roll-up tarpaulin assembly 52 includes a tarpaulin 54 with a first edge 56 having a sleeve 58 that extends the length of the tarpaulin. A fixed shaft 60 is inserted into the sleeve 58 and is clamped to the upper portion of the side wall 18 by pipe retainers 62 and bolts 64. As shown in the drawing the shaft 60 is a pipe. A rotatable bar 66 passes through a sleeve 68 on the second edge 70 of the tarpaulin 54. Clamps 72 prevent rotation of the bar 66 within the sleeve 68. As shown in the drawing, the rotatable bar 66 is a round pipe.

A square shaft 74 is telescopically received in a square tube 76. A plate 78 is welded to one end of the square shaft 74 and a splined shaft 80 with a collar 82 is welded to the other end of the square shaft 74. The plate 78 and the collar 82 retain the square shaft 74 within the square tube 76. However, the space between the plate 78 and the collar 82 allows the shaft 74 to move axially relative to the square tube 76 about ½ meter. The square tube 76 is inserted into the rotatable bar 66 and is welded to the bar. The square tube 76 is positioned within the tubular bar 66 in a position in which the shaft 74 can be moved axially into the square tubes 76 until the collar 82 contacts the square tube and the splined portion of the splined shaft 80 extends axially from the rotatable bar. The shaft 74 can also be moved axially relative to the square tube 76 in the opposite direction until the plate 78 contacts the square tube and the collar 82 is axially spaced from the bar 66 as shown in FIG. 8.

A universal joint 84 has a first yoke 86 with a splined bore 88. The splined bore 88 receives the splined portion of the splined shaft 80. A bolt 90 passes through a portion of the yoke 86 and a portion of the groove 92 in the splined shaft 80 to lock the universal joint 84 to the splined shaft. A second yoke 94 is pivotally attached to the first yoke 86 by a spider 96 with two pairs of journals with transverse axies that are spaced 90° apart. The second yoke 94 has a bore 95 that received an end of the elongated torque tube 98 of the crank 100. A pin 102 retains the elongated shaft 98 in the bore 95 in the yoke 94. A pivot joint 104 is formed in the elongated torque tube 98 by a pin 106 that pivotally connects the crank end 108 of the crank 100 to the universal joint end 110. A slidable sleeve 112 stored on the universal joint end 110 slides over the end of the crank end 108 when the crank end is in axial alignment with the universal joint end to lock the pivot joint 104 and hold the crank 100 in a working position. Clevises 114 are provided on both sides of the cargo container 10 to secure the crank 100 and prevent rotation of the rotatable bar 66. Clevises 114 can also be provided on the rear end wall 24 to secure the crank 100 if desired.

Figure 2:
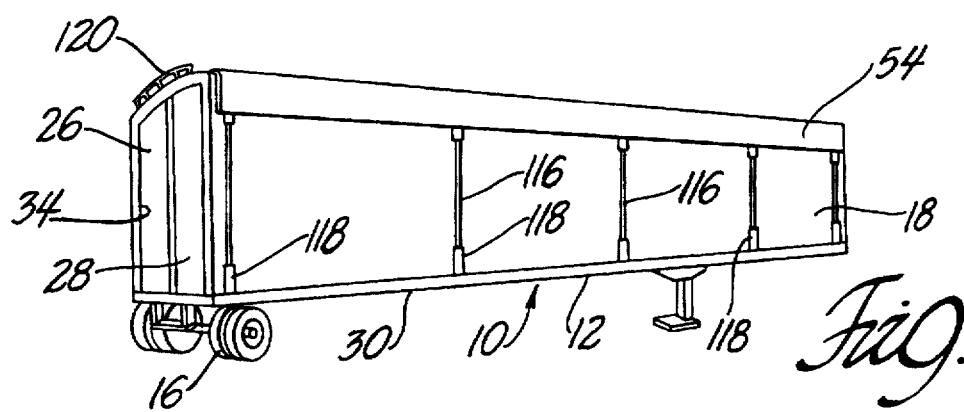
FIG. 2 is a reduced perspective view showing tarp securing straps on the right side of a semitrailer.
Figure 3:
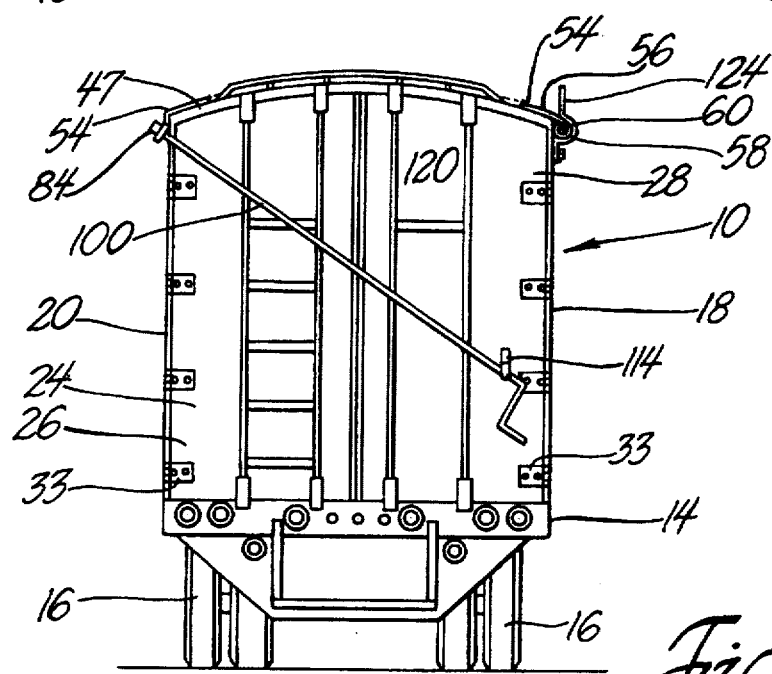
FIG. 3 is an enlarged rear elevational view of a semitrailer with crank secured to the rear end wall.
Figure 4:
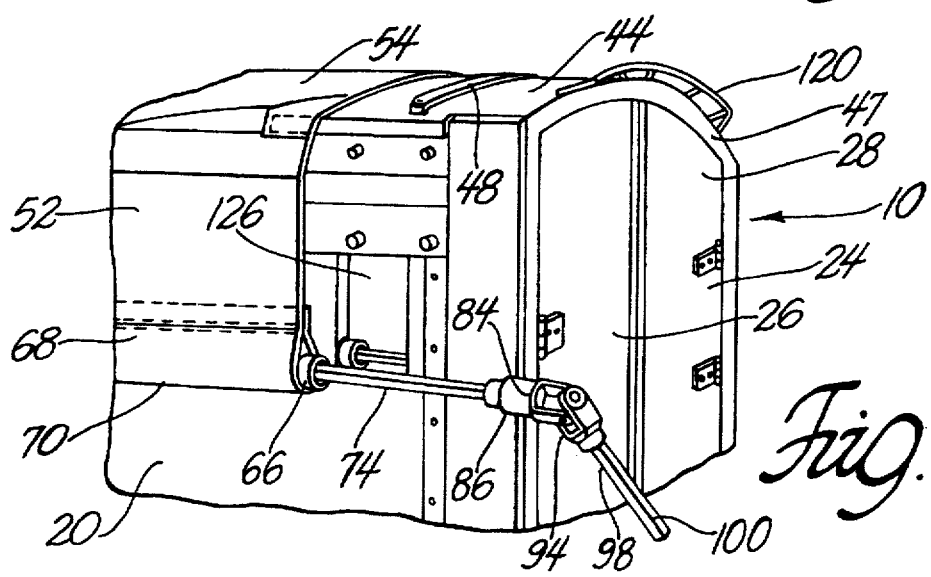
FIG. 4 is an enlarged perspective view of a portion of the cargo container and the tarpaulin assembly.
Figure 5:
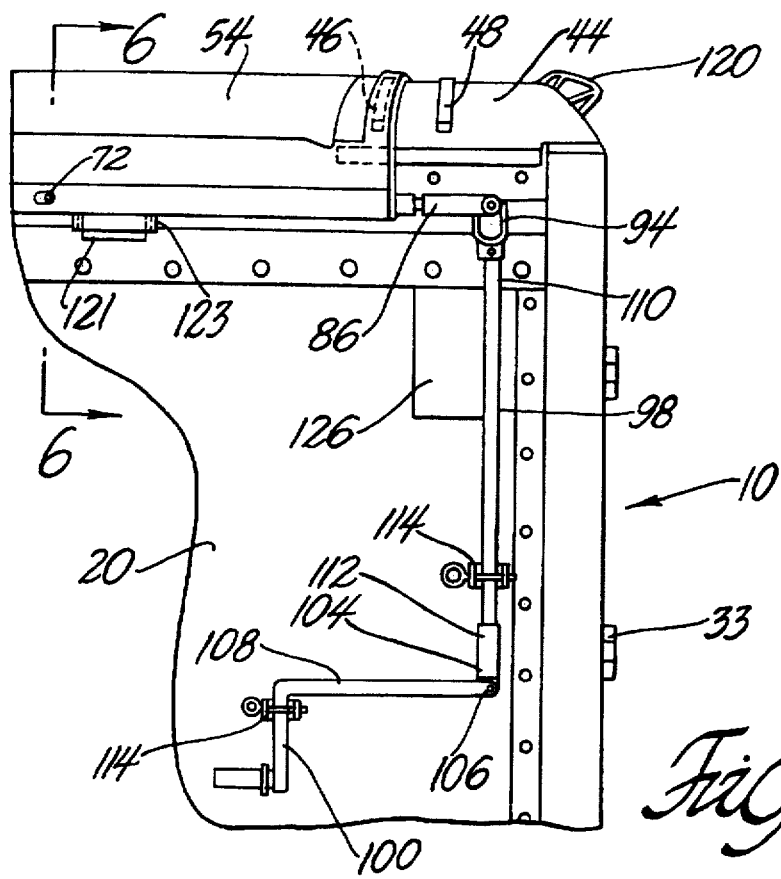
FIG. 5 is a side elevational view of the crank secured to the left side wall.

The second edge 70 of the tarpaulin 54 can be secured to hold the tarpaulin covering the open top of the cargo container 10 and to tension the tarpaulin 54 by connecting straps 116 to strap ratchet assemblies 118 and tightening the straps as shown in FIG. 2.

Figure 6:
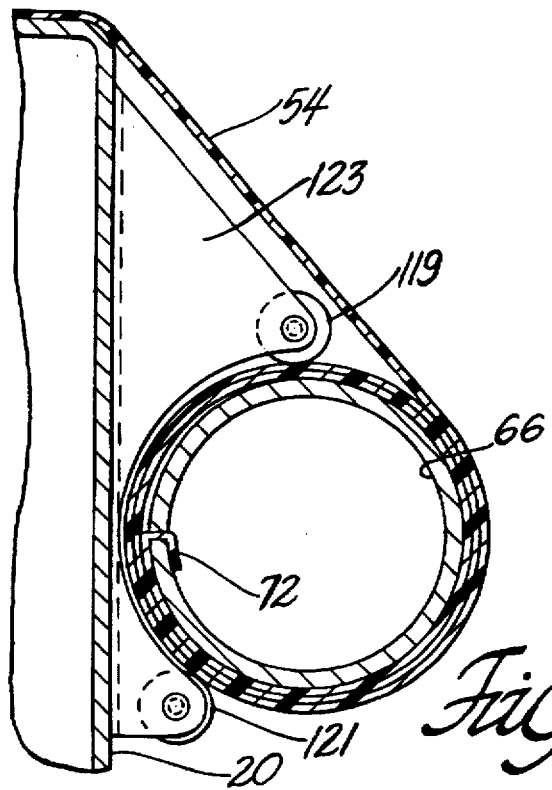
FIG. 6 is an enlarged sectional view taken along line 6—6 in FIG. 5 showing an alternative tarpaulin holding and tightening system.
Figure 7:
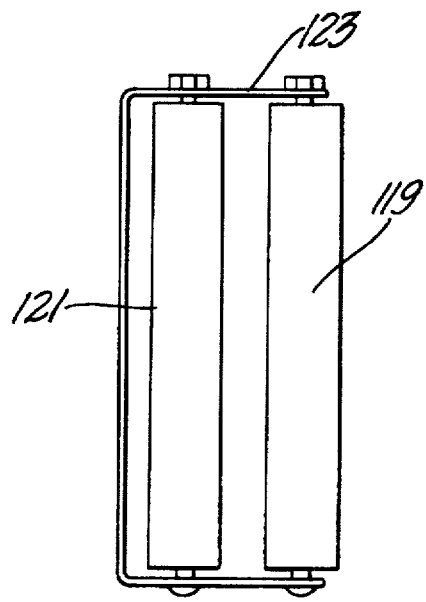
FIG. 7 is a top plan view of the tarpaulin holding and tightening system shown in FIG. 6.

The rotatable bar 66 can also be wound up on the tarpaulin 54 and under a lock plate as disclosed in U.S. Pat. No. RE 31,746 or the rotatable bar can be rotated to wind the tarpaulin on the rotatable bar and move the rotatable bar into contact with a plurality of rollers 119 and 121 as shown in U.S. Pat. No. 3,563,591 and illustrated in FIGS. 6 and 7. The rollers 119 and 121 are journaled on a plurality of brackets 123 attached to the side wall 20.

The roll-up tarpaulin assembly 52 is opened to uncover the open top 50 of cargo 10 by releasing the straps 116 or an alternate holding system, removing the crank 100 from the devises 114, sliding the sleeve 112 into a locking position and sliding the square shaft 74 to the rear until the spider 96 of the universal joint 84 is to the rear of the rear wall 24 of the container 10 and the hand hold bar 120. The crank 100 is then rotated manually to roll the rotatable bar 66 on the outer surface of the tarpaulin 54 and wrap the tarpaulin around the rotatable bar. Continued rotation of the rotatable bar 66 will roll the rotatable bar across the end caps 36 and 44 and cross bars 122. The end caps 36 and 44 as shown have upper surfaces that are arcs about a horizontal fore and aft axis. The cross bars 122 should also be arcs like the end caps 36 and 44. However, if desired, the end caps 36 and 44, as well as the cross bars 122 could be flat rather than arched. The crank 100 is rolled until the tarpaulin 54 is tightly wrapped around the rotatable bar 66 and is against the stop bars 124 secured to the right side wall 18. The crank 100 can then be secured by devises 114 on the rear wall 24 or the square shaft 74 can be slid axially forward relative to the square tube 76, until the universal joint 84 is forward of the rear end wall 24, and the crank 100 is secured by the devises 114 on the right side wall 18. The crank 100 and the universal joint 84 keep the rotatable bar 66 from rotating and secure the tarpaulin 54.

The open top 50 of the cargo container 10 is covered by releasing the crank 100 from the devises 114, locking the crank in a working position with the sleeve 112 as described above and then sliding the square shaft 74 and the universal joint 84 axially to the rear. The crank 100 is then rotated to rotate the rotatable bar 66 in a direction to unwrap the tarpaulin 54, roll the rotatable bar across the cargo container 10 to the left side wall 20 and down the outside surface of the left side wall until the tarpaulin 54 is unwrapped. Straps 116 are then attached to ratchet assemblies 118 and tightened or an alternative securing system can be employed. One alternate system for securing the rotatable bar 66 and tightening the tarpaulin 54 is to rotate the rotatable bar with the crank 100 in the same direction it was rotated to unroll the tarpaulin and raise the rotatable bar up against a latch plate (not shown) as described above. A further system for securing the rotatable bar 66 and tightening the tarpaulin 54 is to roll the rotatable bar with the crank 100 into a position between upper rollers 119 and lower rollers 121 as shown in U.S. Pat. No. 3,563,591. The rollers 119 and 121 reduce friction and reduce the force required to rotate the crank 100 and tension the tarpaulin 54. The crank 100 is then secured to the left side wall 20 by the clevises 114. Securing the crank 100 locks the rotatable bar 66 and keeps the tarpaulin 54 tight. The universal joint 84 and the square shaft 74 are preferably slid forward before the rotatable bar 66 is anchored and the tarpaulin 54 is tensioned. A metal scuff plate 126 on the outside surface of the left side 20 keeps the universal joint 84 from marring the outside surface of the left side wall when the rotatable bar 66 is rotated, secured and the tarpaulin 54 is tensioned. Tensioning the tarpaulin 54 where it passes over the end caps 36 and 44 holds the tarpaulin against the cap surfaces between the bars 38 and 40 and the bars 46 and 48 thereby creating substantially water tight seals.

The square shaft 74 could be six sided, eight sided, splined, or some other shape as long as it is axially slidable and rotation between the universal joint 84 and the rotatable bar 66 is prevented. The shape of the square tube 76 would have to be modified as required to accommodate a shaft 74 with a modified shape.

The tarpaulin can be reversed if desired, as shown in FIG. 2, so that the first edge 56 is clamped to the left side wall 20 rather than the right side wall 18. Appropriate changes would be required and the location of the crank 100, the stop bars 124 and the assemblies for securing the rotatable bar 66 and tensioning the tarpaulin 54, would be changed.

The preferred embodiment of the invention has been described in detail but is an example only and the invention is not restricted thereto. It will be easily understood by those skilled in the art that modifications and variations can be made within the scope of this invention.

I claim:

1. A roll-up tarpaulin assembly for opening and closing an open top of a vehicle mounted cargo container having a floor, a first side wall, a second side wall, a front end wall, and a rear end wall, comprising:

a tarpaulin having a first edge, a second edge, a front edge and a rear edge;

a clamp assembly securing the first edge of the tarpaulin to the first side wall;

a rotatable bar secured to the second edge of the tarpaulin and extending from a position near the front edge of the tarpaulin to a position near the rear edge of the tarpaulin;

a drive shaft connected to an end of the rotatable bar, coaxially with the rotatable bar, axially movable relative to the rotatable bar and operable to transmit torque to the rotatable bar;

a flexible coupler connected to the drive shaft and operable to transmit torque to the drive shaft;

a crank shaft connected to the flexible coupler, movable with the drive shaft upon axial movement of the drive shaft relative to the rotatable bar between a position rearward of a rear surface of the rear end wall and a position forward of the rear surface of the rear end wall, and which is rotatable in one direction to transmit torque through the flexible coupler and the drive shaft to the rotatable bar, to wind the tarpaulin on the rotatable bar and move the rotatable bar to a position near the first side wall and which is rotatable in another direction to unwind the tarpaulin from the rotatable bar and move the rotatable bar to a position near the second side wall; and a second side wall holder engagable with the crank shaft to hold the crank shaft adjacent to an outer surface of the second side wall and forward of the rear surface of the rear end wall.

2. The roll-up tarpaulin assembly of claim 1 wherein the rear end wall includes a first door pivotally attached to the door frame which is pivotable between a closed position and an open position generally parallel to said first side wall and a second door pivotally attached to the door frame which is pivotable between a closed position and an open position generally parallel to said second side wall.

3. The roll-up tarpaulin assembly of claim 1 wherein the flexible coupler is a universal joint.

4. The roll-up tarpaulin assembly of claim 1 comprising a rear end wall holder engagable with the crank shaft to hold the crank shaft adjacent to an outer surface of the rear end wall when the drive shaft is axially moved to the rear relative to the rotatable bar.

5. The roll-up tarpaulin assembly of claim 1 further comprising a first side wall holder engagable with the crank shaft to hold the crank shaft adjacent to an outer surface of the first side wall and forward of the rear surface of the rear end wall when the tarpaulin is wound around the rotatable bar.

6. The roll-up tarpaulin assembly of claim 1 further comprising a front end cap and a rear end cap.

7. The roll-up tarpaulin assembly of claim 6 wherein the front end cap is attached to the front end wall and the rear end cap is attached to the rear end wall.

8. The roll-up tarpaulin assembly of claim 1 wherein the rotatable bar is a tube and the drive shaft is slidably mounted in the tube.

9. A method of opening and closing an open top of a vehicle mounted cargo container having a floor, a first side wall, a second side wall, a front end wall, and a rear end wall; with a tarpaulin assembly having a tarpaulin with a first edge, a second edge, a front edge, a rear edge, a clamp assembly securing the first edge to the first side, a rotatable bar secured to the second edge of the tarpaulin, a drive shaft connected to an end of the rotatable bar and axially movable relative to the rotatable bar, a flexible coupler connected to the drive shaft and a crank shaft connected to the flexible coupler comprising:

a. moving the drive shaft axially relative to the rotatable bar to move the flexible coupler and the crankshaft to a rear position in which the tarpaulin can be rolled up.

b. manually rotating the crank shaft in one direction to rotate the flexible coupler, the drive shaft and the rotatable bar to roll the tarpaulin on the rotatable bar and open the open top, c. manually rotating the crankshaft in another direction to rotate the flexible coupler, the drive shaft and the rotatable bar to unroll the tarpaulin from the rotatable bar and close the open top;

d. moving the drive shaft axially relative to the rotatable bar to move the flexible coupler to a position forward of the rear end wall; and e. securing the crank shaft adjacent to the second side wall.

10. A method of opening and closing an open top of a vehicle mounted cargo container as set forth in claim 9 including securing the second edge of the tarpaulin to the cargo container when the open top is to be closed.

11. A method of opening and closing an open top of a vehicle mounted cargo container as set forth in claim 10 including releasing the second edge of the tarpaulin from the cargo container when the open top is to be opened.

* * * * *